Patented Nov. 3, 1953

2,658,043

UNITED STATES PATENT OFFICE 2,658,043

POROUS COMPOSITIONS UTILIZING N-CARBOXYAMINOACID ANHYDRIDE

Earl W. Gluesenkamp, Centerville, Ohio, assignor to Monsanto Chemical Company, St. Louis, Mo., a corporation of Delaware No Drawing. Original application September 24, 1948, Serial No. 51,109, now Patent No. 2,610,157, dated September 9, 1952. Divided and this application January 18, 1952, Serial No. 267,320

2 Claims. (Cl. 260—2.5)

This invention relates to new porous, resinous compositions having unusual properties as hereinafter described. More particularly, the invention relates to materials containing uniformly dispersed therein small gas filled cells.

Artificial sponge-like compositions, made from natural gums and resins and from synthetic resins and rubbers, are well known to the art. They are usually made from thermoplastic polymeric compounds by compounding the polymers with substances which evolve gases when heated, and then heating the blended compositions to form numerous minute gas cells. Compositions so obtained have unusually low density and a porous cellular structure.

This application is a divisional application of my copending application Serial No. 51,109, filed September 24, 1948, now patent No. 2,610,157.

One purpose of this invention is to provide new improved porous plastic compositions. A further purpose is to provide new and more effective agents for generating the gas within the plastic body. A still further purpose of this invention is to provide a means of incorporating, reinforcing linear polymers within the structure of the porous body simultaneously with the production of the gas cells. Other purposes will be evident in the following description of the invention.

It has been found that when plastic compositions are compounded with N-carboxyaminoacid anhydrides and then heated, the resulting composition becomes porous by reason of the minute gas cells formed by the decomposition of the anhydrides. In the blowing operation, the non-volatile residue of the N-carboxyaminoacid anhydride is polymerized to form a linear polyamide which serves to reinforce the structure and to modify its physical properties.

The polymerization may be a straight thermal reaction, but in the presence of traces of initiators, for example, active hydrogen compounds, such as water, alcohols and amines, polymerization of two units can be effected with the simultaneous regeneration of the initiator which induces further polymerization in the nature of a chain reaction. In either case, the chemical equation involved is

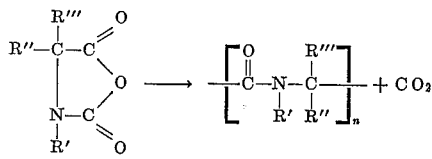

The N-carboxyaminoacid anhydrides may be those derived from the α-aminoacids, the structure of which is described in the preceding equation in which the R′, R″ and R‴ groups may be any alkyl or aryl radicals. Alternatively, the aminoacid anhydrides may be derived from β-amino acids in which case the anhydrides will have the following structural formula:

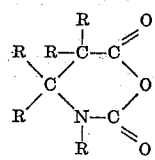

wherein the various R groups may be hydrogen, alkyl or aryl radicals.

Many of the N-carboxyaminoacid anhydrides are known chemical compositions, and others may be prepared from the corresponding amino acids by reacting them with methyl chloroformate to form the N-carbomethoxyamino acid, which is then treated with thionyl chloride to form the corresponding acid chloride, which, upon heating under anhydrous conditions, evolves methyl chloride and cyclizes to form the N-carboxyaminoacid anhydride. The reaction is set forth in the following equations utilizing glycine as an example.

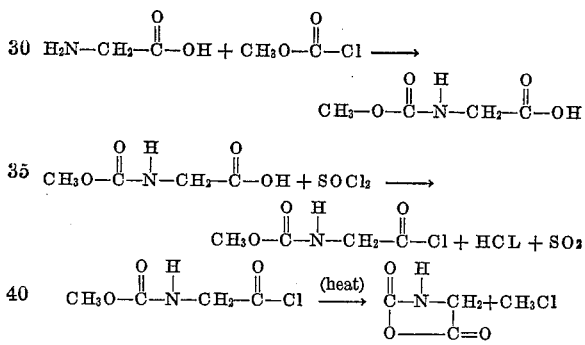

Suitable N-carboxyaminoacid anhydrides are those of N-carboxyleucine, N-carboxyphenylalanine, N-carboxyvaline, N-carboxytyrosine and the corresponding anhydrides of other aminoacids, for example glycine, alanine, valine, leucine, norleucine, isoleucine, isovaline, as well as aminoacids not occurring naturally which may be synthesized by conventional methods. Other useful aminoacids are those containing a radical substituted on the nitrogen atom.

The class of compositions which may be processed in accordance with this invention are the polymers and copolymers of vinyl chloride. This class of compositions includes polyvinyl chloride and copolymers of upward of 70 percent of vinyl chloride, and up to 30 percent of other polymerizable monomers, for example, vinyl acetate and other vinyl esters of monocarboxylic acids, methyl methacrylate and other alkyl esters of methacrylic acid, methyl acrylate and other alkyl esters of acrylic acid, methyl maleate and other alkyl esters of maleic acid, methyl fumarate and other alkyl esters of fumaric acid, and vinylidine chloride.

In processing the polymers and copolymers of vinyl chloride, it is frequently desirable to incorporate from five to 40 percent of a suitable plasticizer to render the composition sufficiently fluid at blowing temperatures. Generally, these are more thermoplastic than cured rubber, and, unless heavily plasticized, less resilient.

The new compositions are prepared by milling the plastic with from 2 to 30 percent by weight of N-carboxyaminoacid anhydride on a cold mill, or at least at a temperature below the minimum decomposition temperature of the N-carboxyaminoacid anhydride, and then confining the sample in a suitable mold in which it is heated to a temperature which induces the polymerization of the N-carboxyaminoacid anhydride, for example, 125 to 200° C. Under such conditions, the N-carboxyaminoacid anhydride polymerizes with the evolution of carbon dioxide, which forms minute gas bubbles in the polymer and produces the desirable low density and porous structure. The density of the porous compositions may be changed by varying the proportion of N-carboxyaminoacid, the most useful composition being prepared with from three to 20 percent.

The invention is defined by the following claims.

I claim:

1. A method of preparing a porous composition, which comprises intimately dispersing from 3 to 20 percent by weight of an N-carboxyaminoacid anhydride in a vinyl chloride polymer, heating the composition to polymerize the N-carboxyaminoacid anhydride and to form gas cells in the composition.

2. A method of preparing a porous composition which comprises intimately dispersing from 3 to 20 percent by weight of N-carboxyglycine anhydride in a vinyl chloride polymer and heating the composition to polymerize the N-carboxyglycine anhydride and form gas cells in the composition.

EARL W. GLUESENKAMP.

References Cited in the file of this patent

UNITED STATES PATENTS

| Number | Name | Date |
| --- | --- | --- |
| 2,265,559 | Watkins | Dec. 8, 1941 |
| 2,534,283 | MacDonald | Dec. 19, 1950 |